(No Model.)
G. H. RAWLINGS.
FISHING FLOAT.
No. 522,167.  Patented June 26, 1894.
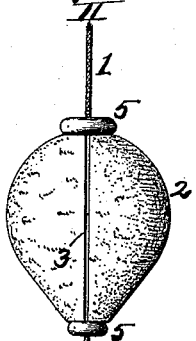
Fig. I.
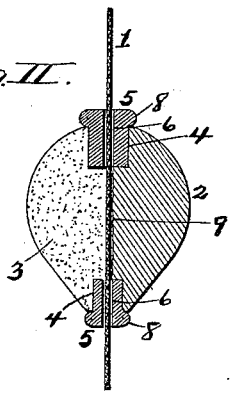
Fig. II.
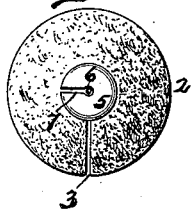
Fig. III.
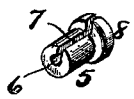
Fig. VI.
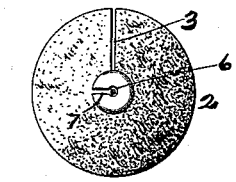
Fig. IV.
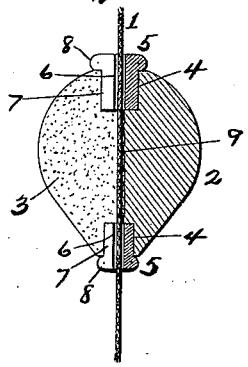
Fig. V.
Attest:
A. M. Ebersole
J. E. Ebersole
Inventor:
Geo. H. Rawlings
By Knight Bros
Attys
THE NATIONAL LITHOGRAPHING COMPANY,
WASHINGTON, D. C.

UNITED STATES PATENT OFFICE.

GEORGE H. RAWLINGS, OF ST. LOUIS, MISSOURI.

FISHING-FLOAT.

SPECIFICATION forming part of Letters Patent No. 522,167, dated June 26, 1894.

Application filed August 28, 1893. Serial No. 484,187. (No model.)

*To all whom it may concern:*

Be it known that I, GEORGE H. RAWLINGS, of the city of St. Louis, in the State of Missouri, have invented a certain new and useful Improvement in Fishing-Floats, of which the following is a full, clear, and exact description, reference being had to the accompanying drawings, forming part of this specification.

My invention relates to a float, which can be readily attached to, and removed from the line, without removing the sinker or hook, which has frictional contact with and is adjustable by merely sliding it up or down on the line, which has a central slot through which the line passes axially, and which is comparatively inexpensive; and my invention consists in features of novelty hereinafter fully described and pointed out in the claims.

Figure I is an elevation of my improved float. Fig. II is a vertical section, showing the float in position for use. Fig. III is a top view of same. Fig. IV is a bottom view. Fig. V is a vertical section, showing the bushings turned so that their slots are in line with the slot in the body of the float, to which position they are turned when the float is to be applied to, or removed from the line. Fig. VI is a perspective view of one of the bushings.

Referring to the drawings, 1 represents part of a fishing line, and 2 is a float which may be made of cork or other material. In one side of this float a vertical slot 3 is cut, which extends to the center of the float, as shown in Figs. III and IV. Each end of the float is provided with a socket 4, to receive a bushing 5. Each bushing has a central perforation 6, from which, to one side of the bushing, is a slot 7, large enough for the passage of the line 1. The outer end of each bushing is preferably provided with a bead 8, by which the bushing may be readily turned in its socket.

In applying the float to the line, the bushings 5 are turned until their slots 7 are in line with the slot 3 of the float, as shown in Fig. V. The line is then inserted by drawing it into the slot of the float, until it comes against the semi-circular wall 9, with which it has frictional contact and in which position it will be received by the perforations 6 in the bushings 5. The bushings are then turned to bring their slots 7 out of line with the slot 3 of the float, and thus the float will be locked to the line, while its longitudinal movement on the line will be retarded only by the friction between the float and the line; this friction being sufficient to prevent the float from moving on the line in the act of fishing. The perforations 6 in the bushings are larger than the diameter of the line, so that there is no tendency for the line to draw the bushings out of their sockets. When it is desired to remove the float from the line, the bushings are again turned to bring their slots 7 in line with the slot 3 of the float, and then the line is drawn laterally from the float, and thus it can be readily removed.

My invention might be carried out to a degree by omitting one of the bushings, and using one only which would serve to hold the float to the line, though two bushings would be better, as then there would be no danger of either end of the float moving away from the line.

I am aware of United States patent to McNeal, dated September 15, 1885, and do not claim anything therein shown and described. My slotted bushings are to be distinguished from his continuous wire with an eye on each end.

I claim as my invention—

1. The combination of a float having an end socket, extending part way through the float, and a slot cut in one side thereof for the reception of the line and with the walls of which the line has frictional contact, and a bushing located in the socket, adapted to be rotated therein, having a central perforation for the reception of the line, and a side slot for the entrance thereof adapted to register with the side slot of the float; substantially as described.

2. The combination of a float having end sockets, extending part way through the float, and a slot cut in one side thereof for the reception of the line and with the walls of which the line has frictional contact, and bushings located in the sockets, and adapted to be rotated therein, each bushing having a central perforation for the reception of the line and a side slot for the entrance thereof adapted to register with the side slot of the float; substantially as described.

3. The combination of a float having end sockets, extending part way through the float, and a slot cut in one side thereof, for the reception of the line and with the walls of which the line has frictional contact, and bushings located in the sockets, and adapted to be rotated therein; each bushing having a central perforation for the reception of the line of larger diameter than the width of the side slot in the float and a side slot for the entrance of the line adapted to register with the side slot of the float; substantially as described.

GEO. H. RAWLINGS.

In presence of—
GEO. H. KNIGHT,
A. M. EBERSOLE.